United States Patent Office 3,613,361
Patented Oct. 19, 1971

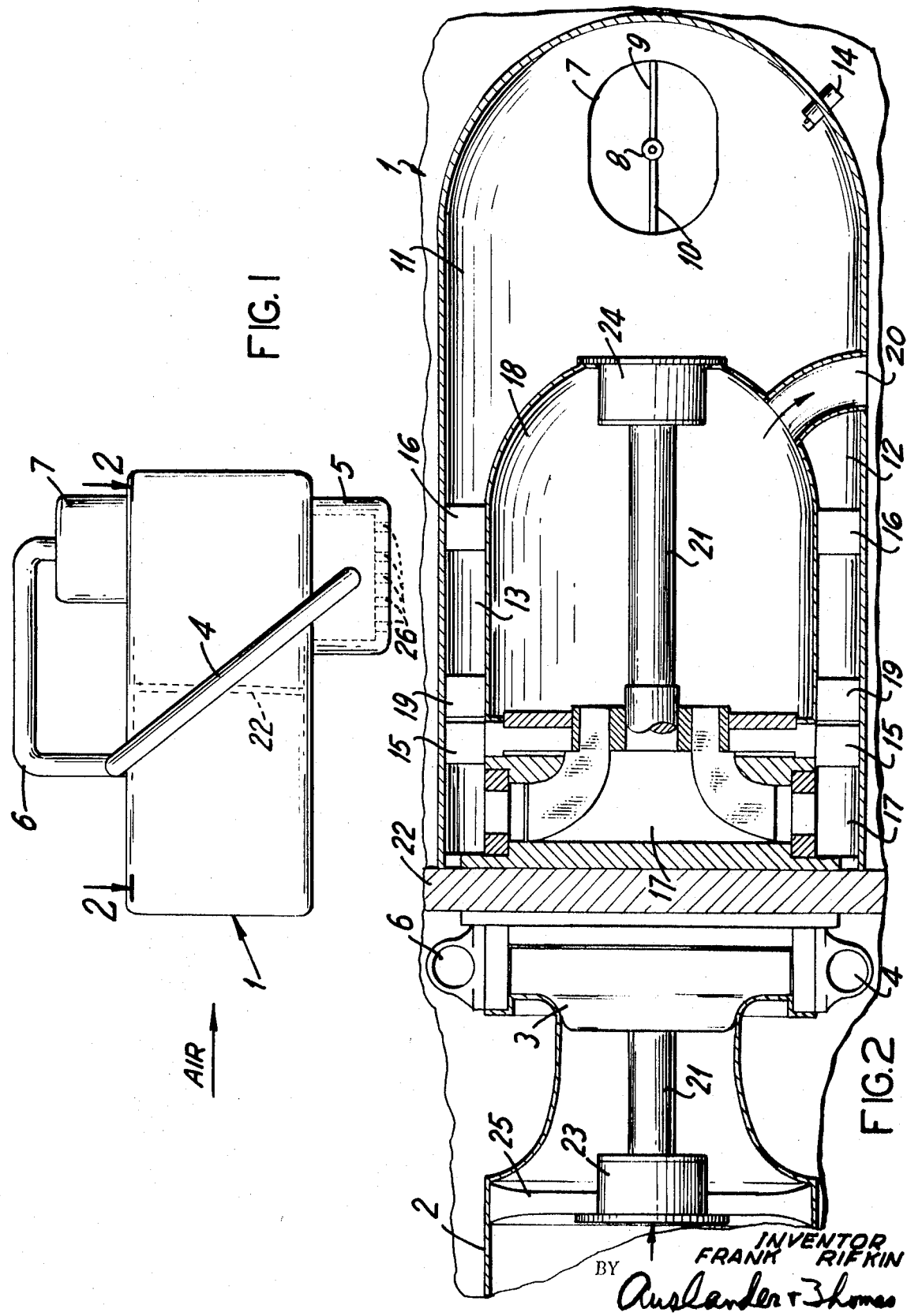

3,613,361
TURBO-COMPRESSOR ENGINE
Frank Rifkin, Roselle, N.J., assignor to Turbo-Compressor Engine Corp.
Filed July 1, 1969, Ser. No. 838,103
Int. Cl. F02c 7/00; F02k 3/02
U.S. Cl. 60—39.41    9 Claims

ABSTRACT OF THE DISCLOSURE

The engine herein described is particularly adapted to create a constantly flowing stream of pressurized gases and generally includes the serial alignment along a common shaft of a first compressor, a second compressor and a turbine. The initial body of air entering the engine is compressed by the first compressor and divided. A portion of the air is directed to the main exhaust or accumulating tank of the engine with the other portion mixed with fuel and ignited. The combustion gases drive the turbine and are further compressed downstream of the turbine by the second compressor. The recompressed exhaust is then recombined with the initially divided first portion of air in the exhaust or accumulating tank.

---

The present invention relates to an internal combustion engine of the turbo-compressor class.

The engine of the present invention is particularly designed to create a constantly flowing stream of pressurized air, thus making the same readily employable for a ground effect vehicle, or to provide lift or to drive a load.

The engine of the present invention provides a system wherein the exhaust products of internal combustion are employed to drive certain of the equipment of the engine and are then further compressed downstream of such equipment for use, in combination with a stream of compressed air to perform a desired function.

According to the present invention, a first compressor initially compresses a stream of air and divides the compressed air into two flows. One flow is channeled directly to the load with the second flow channeled to a combustion chamber where such stream is mixed with fuel, preferably under pressure, and ignited. The combustion gases are directed to an exhaust chamber and subjected to further compression by a second compressor and thence directed for recombination with the first compressed air flow. The turbine and both compressors are serially aligned along a common shaft so that the combustion gases drive the turbine and compressors as well as the supplementary equipment such as the fuel pump.

By compressing the exhaust gases of the combustion subsequent to their driving of the turbine, a continued flow under relatively high pressure is maintained and thus sufficient power is created for a ground lift or to drive a load.

Although such novel feature or features believed to be characteristic of the invention are pointed out in the claims, the invention and the manner in which it may be carried out may be further understood by reference to the description following and the accompanying drawings.

FIG. 1 is a side elevation of an engine of the present invention.

FIG. 2 is a sectional view, partly schematic, taken along lines 2—2 of FIG. 1.

Referring now to the figures in greater detail, where like reference numbers denote like parts in the various figures.

The engine of the present invention generally includes a housing 1, preferably of a light weight metal. A stream of air is introduced into the housing through the duct 2, the air stream intake flow controlled by the centrifugal impeller 3 which is preferably a multi-stage axial impeller.

The impeller 3 compresses the air stream and directs a portion of the compressed air through bypass passage 4 to the air-accumulating tank 5.

The other portion of the compressed air is directed through the air conduit 6 to the air stack 7. The compressed air in the air stack 7 is mixed with fuel delivered into the stack through a fuel nozzle 8 and the fuel and air mixture exit the stack 7 through conduits 9, 10 to the combustion chamber 11.

As shown in FIG. 2, the combustion chamber is substantially a bicrural semiovaloidal or bicrural semispherical conguration with each of the legs 12, 13 of the chamber 11, acting as an exit conduit for the combustion products.

Combustion within the chamber 11 is effected through any known means, such as by use of the spark plug 14 illustrated.

Downstream along the flow of the combustion products in the legs 11, 12, are the turbine blades 15 of the turbine of the engine which are driven by the combustion gases.

If desired, the combustion gases may be passed through a set of diffuser vanes 16 mounted in each leg 12, 13. It is preferable that the diffuser vanes 16 regulate the flow of the combustion gases, preferably to a counterclockwise flow and in a like manner it is preferable that the buckets on the turbine be oriented to counterclockwise rotation.

A second radial inflow impeller 17 located downstream from the turbine blades 15, compresses the turbine exhaust and channels the exhaust, under pressure to an exhaust chamber 18 which, as shown in FIG. 2 is located between the legs 12, 13 and base of the combustion chamber 11.

If desired, spider vanes 19 may interconnect each of the legs 12, 13 directly to the exhaust chamber 18 so that a portion of the combustion gases may be bypassed directly into the exhaust chamber 18 with the remaining, non-bypassed portion of the combustion products driving the turbine blades 15. The bypassing is especially desirable where the temperature tolerances of the turbine make it undesirable for the turbine to be subjected to the full force of the high temperature, highly compressed combustion gases.

The exhaust products within the exhaust chamber 18 exit the exhaust chamber through an exit conduit 20, preferably including a nozzle arrangement for regulation of the flow and are directed to the air accumulating tank 5 for recombination with the initially divided air flow from the first impeller 3.

Prior to the exhaust reaching the accumulating tank 5, its force may be employed to drive the fuel pump and/or generator (not shown) for the engine.

As shown in FIG. 2, both impellers 3, 17 and the turbine are axially aligned along a common shaft 21 with the first impeller 3 and the second impeller 17 separated by a wall plate 22.

The shaft 21 may be mounted in a conventional manner such as in the bearing housings 23, 24, illustrated with one of the bearing housings 23 mounted on struts 25 along the intake duct 2 and the other bearing housing 24 emplaced within the base of the combustion chamber 11.

The turbine drives the shaft 21 and as can be readily understood, a starter system (not shown) is employed for initial actuation of the turbine.

As shown in FIG. 1, the exhaust accumulating tank 5 may include nozzle outlets 26 for the controlled flow of compressed air and exhaust outward of the engine either to provide a ground effect, lift or to drive a load (not shown).

The terms and expressions which are employed are used as terms of description; it is recognized, though, that various modifications are possible.

Having thus described certain forms of the invention in some detail, what is claimed is:

1. A turbo-compressor engine providing a continuous supply of compressed gases comprising a first compressor adapted to compress a body of air and divide such compressed body of air into two streams, first conduit means interconnecting said first compressor with an exhaust tank for direct flow of one of said streams therebetween, second conduit means interconnecting said first compressor with a combustion chamber for flow of the second of said streams to said combustion chamber, means to introduce fuel to said second stream, means to ignite said fuel and second stream mixture in said combustion chamber, combustion products turbine means downstream of said combustion chamber, second compressor means downstream of said turbine means and duct means interconnecting said second compressor with said exhaust tank.

2. The apparatus as claimed in claim 1 wherein said first compressor is a centrifugal impeller.

3. The apparatus as claimed in claim 1 further including an air stack intermediate said first compressor and said combustion chamber.

4. The apparatus as claimed in claim 1 wherein said combustion chamber is of a substantially bicrural semi-ovaloid configuration.

5. The apparatus as claimed in claim 1 wherein said second compressor is a radial inflow impeller.

6. The apparatus as claimed in claim 1 wherein said first compressor means, second compressor means and said combustion products turbine are serially aligned along a common shaft.

7. The apparatus as claimed in claim 6 wherein said first compressor means and said second compressor means are separated by a wall plate.

8. The apparatus as claimed in claim 1 further including a chamber intermediate said second compressor means and said exhaust tank, said chamber including means to meter the flow between said second compressor means and said exhaust tank.

9. The apparatus as claimed in claim 1 further including means in said exhaust tank for the metered exhaust of said compressed gases therefrom.

References Cited

UNITED STATES PATENTS

| | | | |
|---|---|---|---|
| 2,603,948 | 7/1952 | Mims | 60—39.52 |
| 2,623,356 | 12/1952 | Coanda | 60—262 |
| 3,369,361 | 2/1968 | Craig | 60—39.41 |

DOUGLAS HART, Primary Examiner

U.S. Cl. X.R.

60—39.68, 262